United States Patent
Griffin et al.

(10) Patent No.: US 12,197,810 B2
(45) Date of Patent: Jan. 14, 2025

(54) AUDIO WATERMARKING TO PREVENT MEETING HOWL

(71) Applicant: Cisco Technology, Inc., San Jose, CA (US)

(72) Inventors: Keith Griffin, Oranmore (IE); Samer Lutfi Hijazi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 179 days.

(21) Appl. No.: 17/902,005

(22) Filed: Sep. 2, 2022

(65) Prior Publication Data

US 2024/0078077 A1    Mar. 7, 2024

(51) Int. Cl.
| | |
|---|---|
| *H04R 3/02* | (2006.01) |
| *G06F 3/16* | (2006.01) |
| *G10L 19/018* | (2013.01) |
| *G10L 25/78* | (2013.01) |
| *H04R 3/00* | (2006.01) |

(52) U.S. Cl.
CPC ............ *G06F 3/165* (2013.01); *G10L 19/018* (2013.01); *G10L 25/78* (2013.01); *H04R 3/005* (2013.01); *H04R 3/02* (2013.01)

(58) Field of Classification Search
CPC .. H04R 3/005; H04R 3/04; H04R 3/02; G10L 19/018
USPC .......... 381/56–58, 77–82, 58–59, 83, 93, 96
See application file for complete search history.

(56) References Cited

U.S. PATENT DOCUMENTS

| | | | |
|---|---|---|---|
| 9,641,576 B2* | 5/2017 | LaFata | H04N 7/152 |
| 10,079,866 B2 | 9/2018 | Fang et al. | |
| 10,084,833 B2 | 9/2018 | McDonnell et al. | |
| 10,748,549 B2* | 8/2020 | Ganeshkumar | G10L 21/0232 |
| 10,825,460 B1 | 11/2020 | Ramalho et al. | |
| 12,069,113 B2* | 8/2024 | Liu | H04L 65/4038 |
| 2012/0308044 A1 | 12/2012 | Vander Mey et al. | |
| 2015/0373032 A1 | 12/2015 | Stevens et al. | |
| 2019/0166166 A1 | 5/2019 | Chang | |
| 2019/0385623 A1 | 12/2019 | Huber | |
| 2020/0302036 A1 | 9/2020 | Khan | |
| 2022/0415333 A1* | 12/2022 | Zhu | G10L 25/51 |

OTHER PUBLICATIONS

Wu et al., "Audio watermarking scheme with dynamic adjustment in mute period," Expert Systems with Applications, vol. 38, Issue 6, Jun. 2011, 6 pages.

* cited by examiner

*Primary Examiner* — Disler Paul
(74) *Attorney, Agent, or Firm* — Edell, Shapiro & Finnan, LLC (57) ABSTRACT

Presented herein are techniques in which a first device connects to a communication session in which a plurality of devices communicates. The plurality of devices includes the first device and a second device. The first device outputs first audio that includes a first audio watermark associated with the communication session and the second device outputs second audio that includes a second audio watermark associated with the communication session. The first device detects the second audio watermark in the second audio outputted by the second device and one or more actions are performed in response to detecting the second audio watermark.

20 Claims, 5 Drawing Sheets

310 — CONNECTING, BY A FIRST DEVICE, TO A COMMUNICATION SESSION IN WHICH A PLURALITY OF DEVICES COMMUNICATE, THE PLURALITY OF DEVICES INCLUDING THE FIRST DEVICE AND A SECOND DEVICE, THE FIRST DEVICE OUTPUTTING FIRST AUDIO THAT INCLUDES A FIRST AUDIO WATERMARK ASSOCIATED WITH THE COMMUNICATION SESSION, AND THE SECOND DEVICE OUTPUTTING SECOND AUDIO THAT INCLUDES A SECOND AUDIO WATERMARK ASSOCIATED WITH THE COMMUNICATION SESSION

320 — DETECTING, BY THE FIRST DEVICE, THE SECOND AUDIO WATERMARK IN THE SECOND AUDIO OUTPUTTED BY THE SECOND DEVICE

330 — PERFORMING ONE OR MORE ACTIONS IN RESPONSE TO DETECTING THE SECOND AUDIO WATERMARK

AUDIO WATERMARKING TO PREVENT MEETING HOWL

TECHNICAL FIELD

The present disclosure relates to preventing meeting howl during online meetings.

BACKGROUND

A common problem that occurs during online meetings or collaboration sessions is the phenomenon of meeting howl. Meeting howl occurs when an audio feedback loop is created when devices that are outputting audio from the same meeting are in close proximity, which results in an audio howl or screech caused by the audio feedback.

DETAILED DESCRIPTION

Overview

The methods described herein involve connecting, by a first device, to a communication session in which a plurality of devices communicate, the plurality of devices including the first device and a second device. The first device outputs first audio that includes a first audio watermark associated with the communication session, and the second device outputs second audio that includes a second audio watermark associated with the communication session. The first device detects the second audio watermark in the second audio outputted by the second device, and performs one or more actions in response to detecting the second audio watermark.

Example Embodiments

In an online meeting space environment, participants and/or users (these terms are used interchangeably throughout the description) are participating via their respective devices. The participant and the respective device, such as a computer, laptop, tablet, smart phone, videoconference endpoint, etc., may collectively be referred to as endpoints, endpoint devices, or devices. The devices may communicate with each other via one or more networks such as the Internet.

Some of the devices may have video capabilities in a communication session. Video capabilities may include, but are not limited to, live feed of a respective participant on a user interface screen. Other devices may not have video capabilities in the communication session and may only have audio capabilities. Further, some of the devices may have interactive connectivity to manipulate content on the user interface screen and other devices may have view-only capability to be able only to view content during the collaboration session. These are just some examples and are not provided by way of limitation.

When two or more devices that are outputting audio from the same online meeting or communication session are close to one another or in the same vicinity (e.g., close enough that a microphone from one device is able to pick up the audio output from the other device), meeting howl can occur. Meeting howl occurs when an audio feedback loop is created when two or more devices in the vicinity of one another are outputting audio from the same online meeting. More specifically, the meeting howl can occur when sound input into a microphone of a first device is played through the speaker of another device and then picked up again by the microphone of the first device. The meeting howl can result in an audio howl or screech, which may be disruptive to the meeting.

Figure 1:
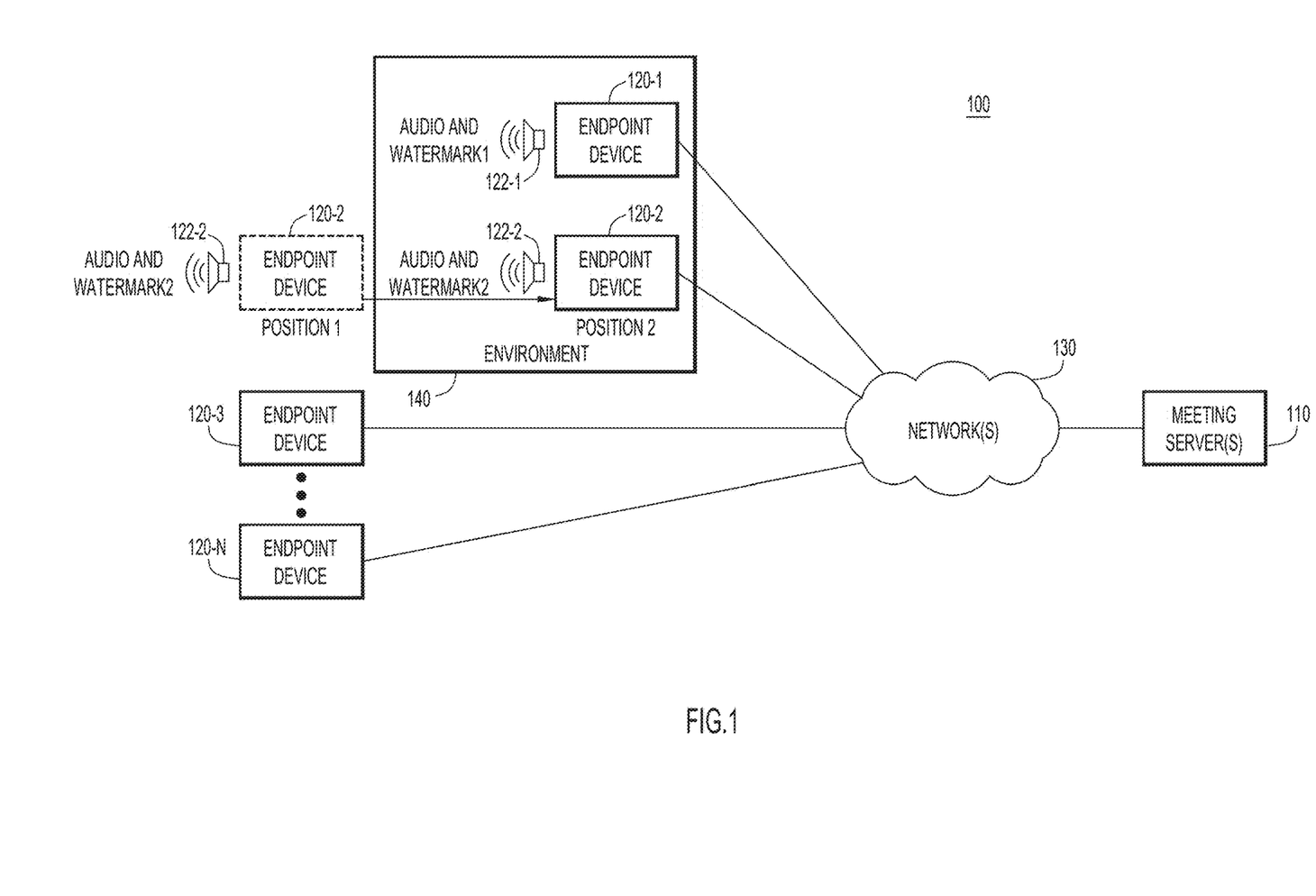
FIG. 1 is a block diagram of a system configured to prevent meeting howl based on detecting an audio watermark in meeting audio, according to an example embodiment.

Reference is first made to FIG. 1. FIG. 1 shows a block diagram of a system 100 that is configured to prevent meeting howl when two devices outputting audio from the same communication session are in the same environment. The system 100 includes one or more meeting server(s) 110 and a plurality of endpoint devices 120-1, 120-2, 120-3, to 120-N that communicate with meeting server(s) 110 via one or more networks 130. The meeting server(s) 110 are configured to provide an online meeting service for hosting a communication session among endpoint devices 120-1 to 120-N. The meeting server(s) 110 support the communication session and provide services associated with the communication session.

The endpoint devices 120-1 to 120-N may be tablets, laptop computers, desktop computers, Smartphones, virtual desktop clients, videoconference endpoints, or any user device now known or hereinafter developed that can run a meeting client/application or similar communication functionality. In some embodiments, one or more of the endpoint devices 120-1 to 120-N may be videoconference endpoints configured to provide videoconference services to one or more users in a meeting or conference room (or other area), such as environment 140. The endpoint devices 120-1 to 120-N may have a dedicated physical keyboard or touchscreen capabilities to provide a virtual on-screen keyboard to enter text. The endpoint devices 120-1 to 120-N may output audio from the online meeting or videoconference using speakers, such as speakers 122-1 and 122-2.

The network(s) 130 may include wired local and wide-area networks as well as wireless local and wide-area networks. The endpoint devices 120-1 to 120-N may also have short-range wireless system connectivity (such as Bluetooth™ wireless system capability, ultrasound communication capability, etc.) to enable local wireless connectivity with a videoconference endpoint in a meeting room (such as environment 140) or with other endpoint devices in the same meeting room.

According to embodiments described herein, audio watermarks may be embedded in the audio of an online meeting or communication session (e.g., to protect meeting distribution, to prevent meeting howl, etc.). Each audio watermark may be unique to an endpoint device and may include an identifier associated with the meeting and an identifier associated with the endpoint device. The audio watermark may be embedded in the audio of the online meeting and output by a device along with the audio. As illustrated in FIG. 1, speaker 122-1 of endpoint device 120-1 may output audio from an online meeting that includes watermark1. In this example, watermark1 may include an identifier associated with the meeting and an identifier associated with endpoint device 120-1. As further illustrated in FIG. 1, speaker 122-2 of endpoint device 120-2 may output audio from the online meeting that includes watermark2. Watermark2 may include the identifier associated with the meeting and an identifier associated with endpoint device 120-2.

In the example illustrated in FIG. 1, a user may be participating in the online meeting in environment 140 using endpoint device 120-1. For example, a user may be participating in the online meeting using a user device or a videoconference endpoint located in a conference room. Speaker 122-1 of endpoint device 120-1 may output audio from the online meeting and the audio may include watermark1. Another user may be participating in the online meeting using endpoint device 120-2 located at position 1 (e.g., outside of environment 140). A speaker 122-2 of endpoint device 120-2 may output the audio associated with the online meeting and the audio may include watermark2. As discussed above, both watermark) and watermark2 include an identifier associated with the online meeting.

In the example described with respect to FIG. 1, endpoint device 120-2 may move from position 1 (outside of environment 140) to position 2 (inside environment 140). As discussed above, when two devices are outputting audio from the same meeting in the same area, meeting howl may occur. To prevent meeting howl from occurring, embodiments described herein provide for dropping audio from endpoint device 120-1 or endpoint device 120-2 when endpoint device 120-2 enters environment 140. Other embodiments described herein provide for performing another actions, such as synchronizing the microphones of endpoint device 120-1 and endpoint device 120-2, to prevent meeting howl when endpoint device 120-2 enters environment 140.

A determination that endpoint device 120-1 and endpoint device 120-2 are in close proximity may be made when one or more endpoint devices detect the audio watermark associated with the online meeting in audio output by one or more other endpoint devices. In one example, endpoint device 120-1 may detect watermark2 from the audio output from endpoint device 120-2. In another example, endpoint device 120-2 may detect watermark) from the audio output by endpoint device 120-1. In yet another example, endpoint device 120-1 may detect watermark2 and endpoint device 120-2 may detect watermark1.

In some embodiments, when endpoint device 120-1 and/or endpoint device 120-2 detects an audio watermark associated with the online meeting, endpoint device 120-1 or endpoint device 120-2 may automatically drop the audio associated with the online meeting (while maintaining a connection with the online meeting). In other embodiments, endpoint device 120-1 and/or endpoint device 120-2 may transmit a message to meeting server(s) 110 indicating that the watermark associated with the online meeting has been detected and meeting server(s) 110 may perform one or more actions to prevent or minimize meeting howl. For example, meeting server(s) 110 may drop audio from one of endpoint device 120-1 or 120-2. As another example, meeting server(s) 110 may synchronize microphones associated with endpoint devices 120-1 and 120-2 to operate in a multi-microphone scenario.

In the example in which one of the endpoint devices 120-1 or 120-2 disables/mutes audio associated with the online meeting to prevent meeting howl, the endpoint device(s) 120-1 and/or 120-2 and/or meeting server(s) may determine which endpoint device is to disable audio based on a number of factors. In one implementation, a determination of which endpoint device is to disable the audio is based on the types of endpoint devices that are in the same area. For example, if one of the endpoint devices is a user device connected to the meeting using a meeting client or application and the other endpoint device is a videoconference endpoint connected to the online meeting, a determination may be made that the user device running the client/application is to drop the audio associated with the online meeting.

In the example described in FIG. 1, endpoint device 120-1 may be a videoconference endpoint in a meeting room and endpoint device 120-2 may be a user device, such as a laptop computer or a mobile device. If a user of endpoint device 120-2 enters the meeting room, endpoint device 120-2 may drop the audio associated with the online meeting. In this scenario, endpoint device 120-2 may detect watermark) embedded in the audio output by endpoint device 120-1 and endpoint device 120-2 may automatically drop the meeting audio. In one embodiment, endpoint device 120-2 may automatically drop the meeting audio based on user or device settings. For example, the settings may indicate that endpoint device 120-2 is to automatically disable audio when an audio watermark corresponding to a meeting in which endpoint device 120-2 is participating is detected.

In another embodiment, endpoint device 120-2 may identify endpoint device 120-1 as a videoconference endpoint based on the device identifier in watermark1 and endpoint device 120-2 may drop audio based on identifying endpoint device 120-1 as a videoconference endpoint. As another example, endpoint device 120-2 may transmit to meeting server(s) 110 an indication that watermark) has been detected and meeting server(s) 110 may drop audio from endpoint device 120-2 based on identifying that endpoint device 120-1 is a videoconference endpoint and endpoint device 120-2 is a user device running a meeting client/application.

In another embodiment, the decision of which endpoint device is to disable audio may be based on user interaction. For example, endpoint device 120-1 and/or endpoint device 120-2 may prompt a user to select whether to disable the audio from the endpoint device and the decision of which endpoint device is to disable the audio may be based on the user's response. In another example, voice activity detection or active speaker detection may be used to determine which endpoint device is to disable audio. In this example, if a user of an endpoint device is currently speaking or presenting, the audio associated with the endpoint device may not be disabled until the user is no longer speaking (or no longer speaking for a period of time).

The decision of which endpoint device is to disable the audio associated with the meeting may be based on additional factors not described above. Additionally, the decision may be made by an endpoint device 120-1 to 120-N, by meeting server(s) 110, or by another device. Although only two endpoint devices are illustrated in environment 140, environment 140 may include any number of endpoint devices 120-1 to 120-N. In a situation where environment 140 includes many endpoint devices, the decision of which endpoint devices are to disable audio and which endpoint device is to output audio may be based on more than one factor. In this case, meeting server(s) 110 may receive information about the endpoint devices detected in environment 140 and meeting server(s) 110 may disable audio from particular endpoint devices based on, for example, the types of the endpoint devices, settings associated with the endpoint devices, active speakers associated with the endpoint devices, etc. Additionally or alternatively, endpoint devices may automatically disable their own audio when entering environment 140 that includes at least one other endpoint device outputting audio from the same online meeting.

In some embodiments, endpoint device 120-2 may transmit an indication to meeting server(s) 110 that watermark) has been detected and meeting server(s) 110 may determine to perform an action different than disabling audio. For example, meeting server(s) 110 may synchronize microphones associated with endpoint device 120-1 and endpoint device 120-2 so that endpoint devices operate in a multi-microphone scenario. Meeting server(s) 110 may additionally perform additional or different actions to prevent or minimize a duration of meeting howl.

By disabling audio associated with an online meeting (or performing other actions, such as microphone synchronization) when two or more endpoint devices that are outputting audio from the same online meeting are in the same area, meeting howl may be avoided or minimized. Avoiding or minimizing the meeting howl may prevent disruptions during the online meeting and provide a higher quality meeting experience.

Figure 2:
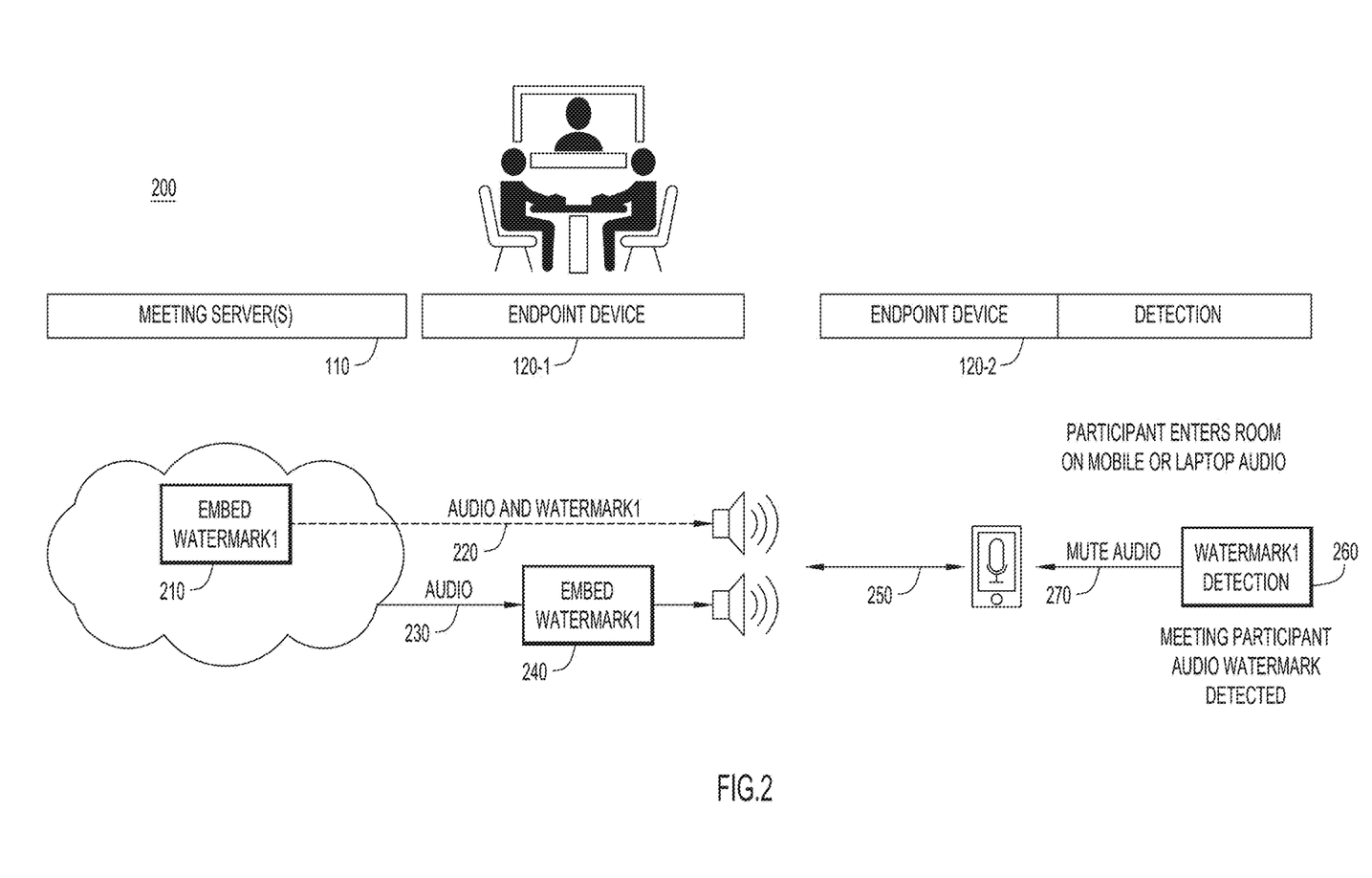
FIG. 2 is a diagram depicting a method for disabling audio for an endpoint device in response to detecting an audio watermark, according to an example embodiment.

Referring to FIG. 2, FIG. 2 is a diagram illustrating a system for performing a method 200 for preventing meeting howl by identifying audio watermarks in meeting audio, according to an embodiment described herein.

In the example illustrated in FIG. 2, endpoint device 120-1 is a videoconference endpoint that is connected to an online meeting and endpoint device 120-2 is a user device with a meeting client/application that is facilitating connection to the online meeting. Endpoint device 120-1 is outputting audio of the meeting that includes watermark) and endpoint device 120-2 is outputting audio of the meeting that includes watermark2. Watermark) includes an identifier associated with the meeting and an identifier associated with endpoint device 120-1 and watermark2 includes the identifier associated with the meeting and an identifier associated with endpoint device 120-2.

An audio watermark may be embedded in the audio of the meeting by different devices. In one embodiment illustrated in FIG. 2, at 210, meeting server(s) 110 embeds watermark) in the audio for endpoint device 120-1 and, at 220, transmits the audio and watermark) to endpoint device 120-1. In this embodiment, meeting server(s) 110 may embed a unique watermark (with the same meeting identifier and a different identifier for each endpoint device) in the audio for each endpoint device. In another embodiment illustrated in FIG. 2, at 230, meeting server(s) 110 transmits the audio for the meeting (and an identifier associated with the meeting) to endpoint device 120-1 and, at 240, endpoint device 120-1 embeds watermark) (including the meeting identifier and the identifier for endpoint device 120-1) in the audio before outputting the audio. In another embodiment (not illustrated in FIG. 2), meeting server(s) 110 may embed the meeting identifier portion of watermark) in the audio and transmit the audio and the meeting identifier to endpoint device 120-1 and endpoint device 120-1 may embed the portion of watermark) that includes the identifier associated with endpoint device 120-2. Although not illustrated in FIG. 2, endpoint device 120-2 additionally outputs audio that includes watermark2. Watermark2 may be embedded in the audio outputted by endpoint device 120-2 in a similar manner as described above.

At 250, the user of endpoint device 120-2 enters the room where endpoint device 120-1 is located. In this example, endpoint devices 120-1 and 120-2 are outputting watermarks (e.g., watermark1 and watermark2, respectively) from the same online meeting. At 260, endpoint device 120-2 detects watermark) in the audio outputted by endpoint device 120-1. The process of detecting the watermark includes a long synch signal pseudo-noise (pn) sequence, payload modulated using spread sequences, low-density parity-coding (LDPC) decoding, and a cyclic redundance check. The long synch signal pn-sequence is used to determine the location of the watermark in the data, and additionally used to estimate the channel (acoustic environment). The channel is then used to equalize the payload bits in the watermark during the dispreading process to extract the payload. The LDPC decoder further reduces any potential bit errors. The cyclic redundancy check produces a high confidence in the watermark detection process. Using this process, the watermark may be detected within a few seconds of the two endpoint devices occupying the same space.

After endpoint device 120-2 detects watermark) in the audio outputted by endpoint device 120-1, at 270, to prevent meeting howl, the audio outputted by endpoint device 120-2 is muted or disabled. In one embodiment, endpoint device 120-2 may automatically disable its audio when endpoint device 120-2 detects watermark) (e.g., based on settings indicating that endpoint device 120-2 is to automatically mute itself based on detecting a watermark associated with a meeting to which endpoint device 120-2 is connected). In another embodiment, endpoint device 120-2 may transmit a message to meeting server(s) 110 indicating that watermark) has been detected and meeting server(s) may disable audio from endpoint device 120-2. Meeting server(s) 110 may disable the audio associated with endpoint device 120-2 based on a number of factors, such as device type (e.g., endpoint device 120-1 is a videoconference endpoint and endpoint device 120-2 is a user device running a meeting client/application), user interaction (e.g., endpoint device 120-1 may be associated with an active speaker), etc.

Although not illustrated in FIG. 2, different actions may be performed to prevent or minimize the meeting howl. For example, meeting server(s) may synchronize microphones associated with endpoint devices 120-1 and 120-2 to prevent the meeting howl.

Figure 3:
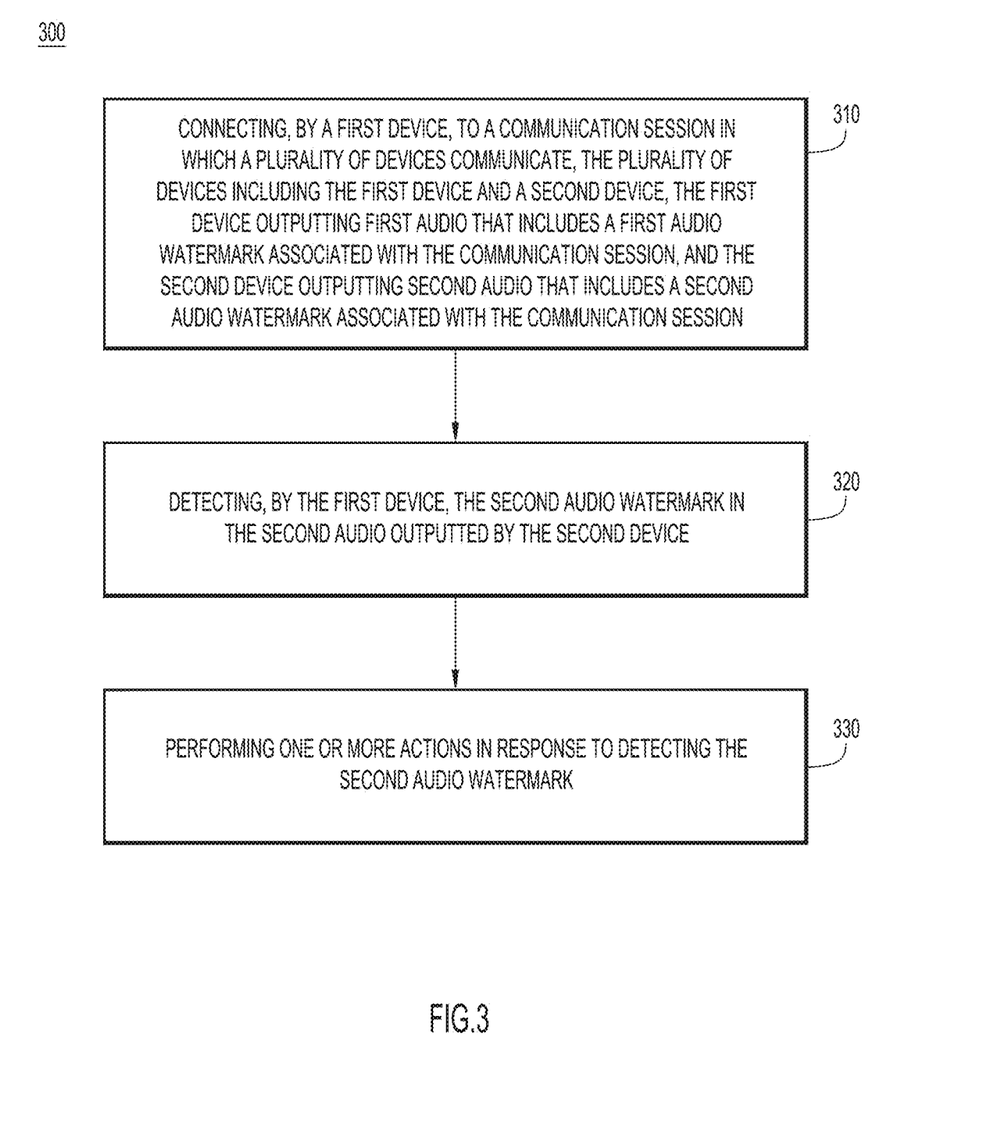
FIG. 3 is a flowchart illustrating a method for preventing meeting howl based on identifying an audio watermark, according to an example embodiment.

Referring to FIG. 3, FIG. 3 is a flowchart illustrating a method 300 of preventing meeting howl by detecting audio watermarks. The method 300 may be implemented by a computing device such as one of the endpoint devices 120-1 to 120-N of FIG. 1 and/or the meeting server(s) 110 of FIG. 1. For example, one of the meeting server(s) 110 may implement the method 300 based on information received from one of the endpoint devices 120-1 to 120-N.

At 310, a first device is connected to a communication session in which a plurality of devices communicates. The plurality of devices includes the first device and a second device. The first device outputs first audio that includes a first audio watermark associated with the communication session and the second device outputs second audio that includes a second audio watermark associated with the communication session. For example, endpoint device 120-2 may connect to a communication session that includes endpoint device 120-1 and optionally additional endpoint devices. Endpoint device 120-2 may output first audio that includes audio associated with the communication session and a first audio watermark (e.g., watermark2). Endpoint device 120-1 may output second audio that includes the audio of the communication session and a second audio watermark (e.g., watermark1). In some embodiments, the first audio watermark may include an identifier associated with the communication session and an identifier associated with endpoint device 120-2 and the second audio watermark may include the identifier associated with the communication session and an identifier associated with endpoint device 120-1.

At 320, the first device detects the second audio watermark in the second audio outputted by the second device. For example, endpoint device 120-2 may enter the vicinity of endpoint device 120-1 while both endpoint devices are outputting audio from the communication session and endpoint device 120-2 may detect watermark1 in the audio outputted by endpoint device 120-1.

At 330, one or more actions are performed in response to detecting the second audio watermark. For example, endpoint device 120-2 may mute or disable the audio from the communication session in response to detecting watermark1 (e.g., to prevent or minimize meeting howl). As another example, endpoint device 120-2 may transmit a message to meeting server(s) 110 indicating that endpoint device 120-2 has detected watermark). To prevent meeting howl, meeting server(s) 110 may perform one or more actions, such as disabling the audio associated with the communication session for endpoint device 120-1 and/or endpoint device 120-2, synchronizing microphones associated with endpoint device 120-1 and endpoint device 120-2, etc.

By performing one or more of the actions, meeting howl resulting from two or more devices in the same vicinity or environment outputting audio from the same online meeting or communication session may be avoided or minimized.

Figure 4:
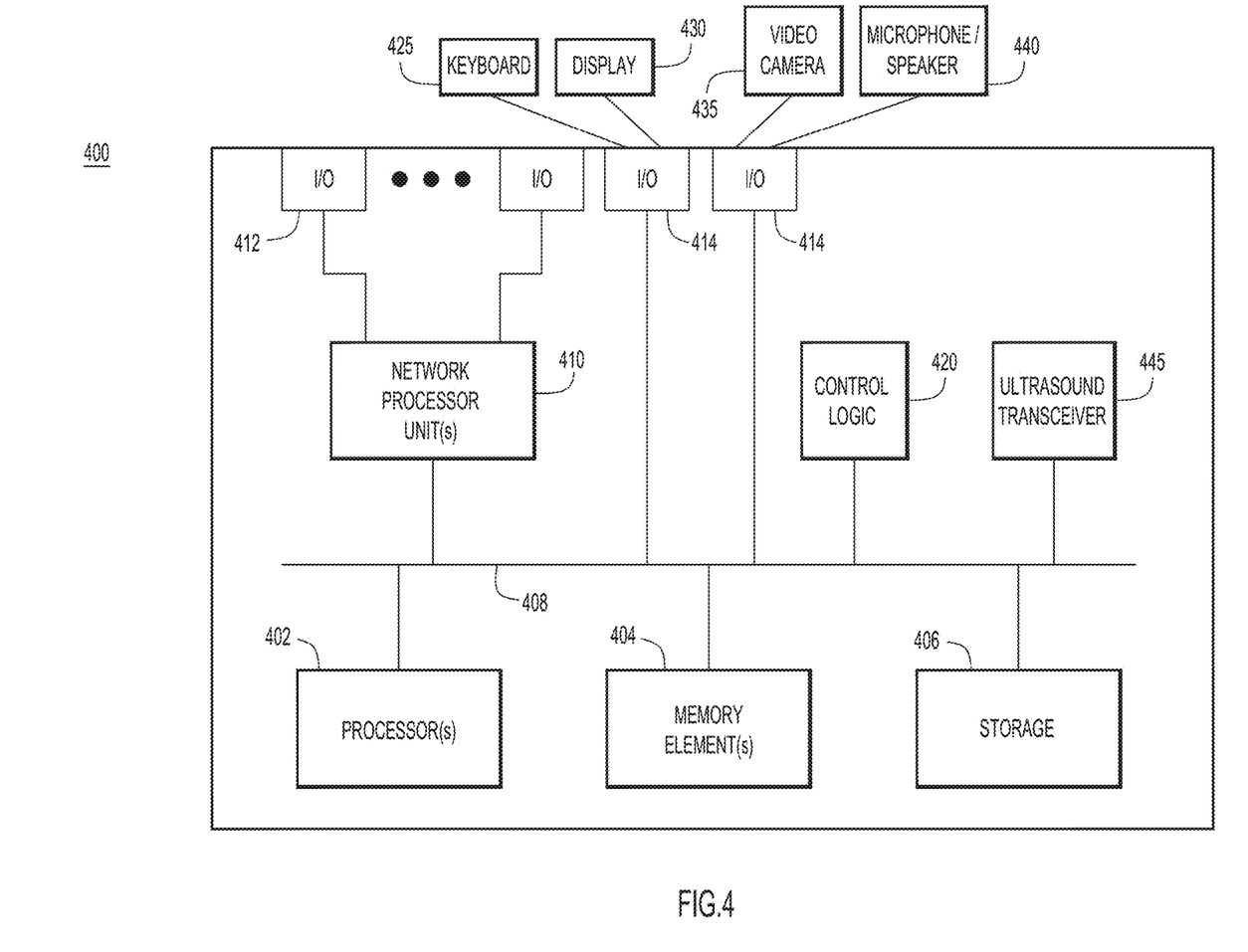
FIG. 4 is a hardware block diagram of a computer device that may be configured to perform the endpoint device-based operations involved in preventing meeting howl based on identifying an audio watermark, according to an example embodiment.

Referring to FIG. 4, FIG. 4 illustrates a hardware block diagram of a computing/computer device 400 that may perform functions of a user device associated with operations discussed herein in connection with the techniques depicted in FIGS. 1-3. In various embodiments, a computing device, such as computing device 400 or any combination of computing devices 400, may be configured as any devices as discussed for the techniques depicted in connection with FIGS. 1-3 in order to perform operations of the various techniques discussed herein.

In at least one embodiment, the computing device 400 may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, any other I/O port(s), and/or antenna(s)/antenna array(s) now known or hereafter developed. Thus, the network processor unit(s) 410 and/or network I/O interface(s) 412 may include suitable interfaces for receiving, transmitting, and/or otherwise communicating data and/or information in a network environment.

I/O interface(s) 414 allow for input and output of data and/or information with other entities that may be connected to computer device 400. For example, I/O interface(s) 414 may provide a connection to external devices such as a keyboard 425, keypad, a touch screen, and/or any other suitable input and/or output device now known or hereafter developed. This may be the case, in particular, when the computer device 400 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display 430 shown in FIG. 4, particularly when the computer device 400 serves as a user device as described herein. Display 430 may have touch-screen display capabilities. Additional external devices may include a video camera 435 and microphone/speaker combination 440. In addition, the computing device 400 may further include an ultrasound transceiver 445 that may be used for the various purposes described herein.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 5:
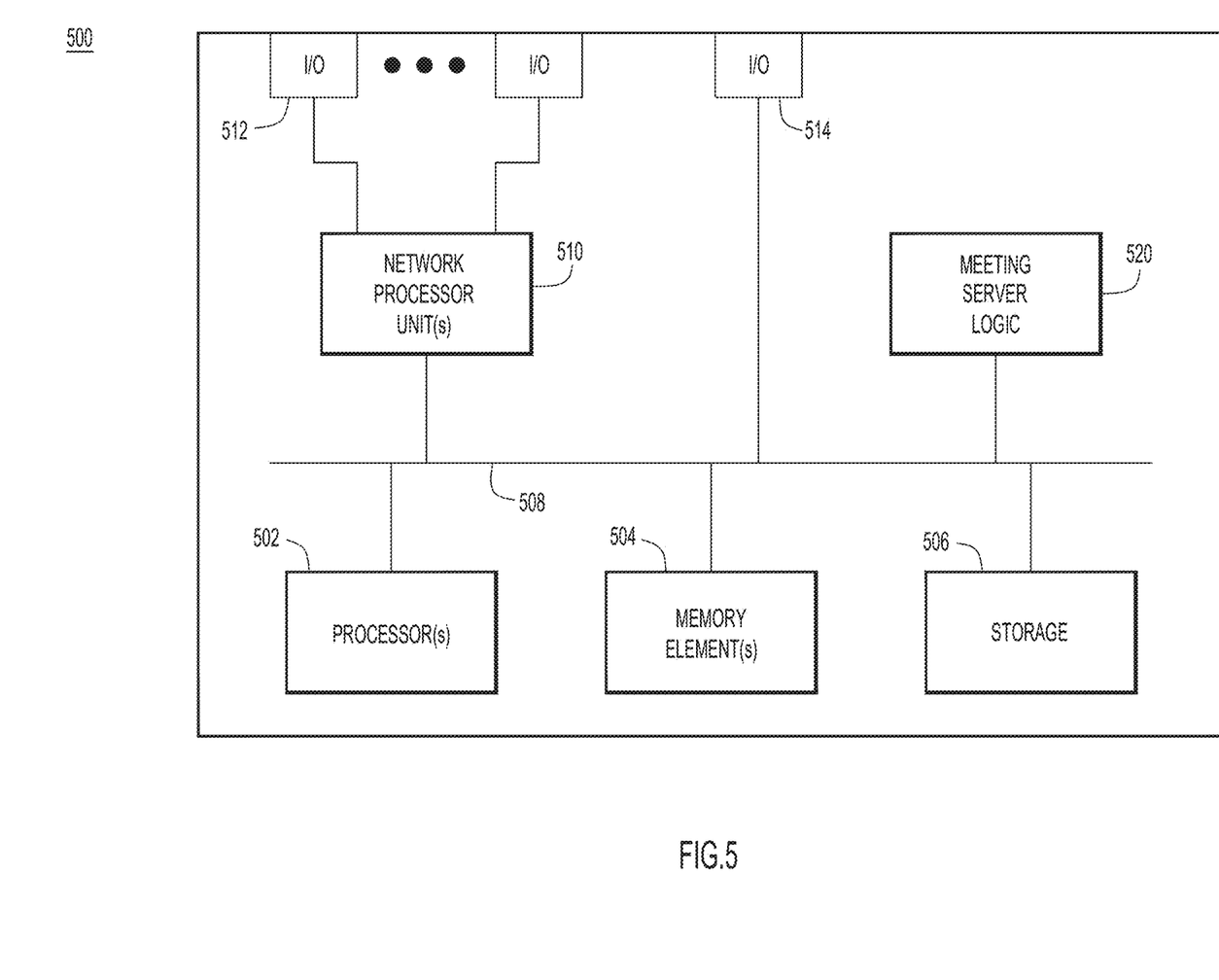
FIG. 5 is a hardware diagram of a computer device that may be configured to perform the meeting server operations involved in meeting howl prevention based on identifying an audio watermark, according to an example embodiment.

FIG. 5 illustrates a block diagram of a computing device 500 that may perform the functions of the meeting server(s) 110 described herein. The computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and meeting server logic 520. In various embodiments, instructions associated with the meeting server logic 520 is configured to perform the meeting server operations described herein, including those depicted by the flow chart for method 300 shown in FIG. 3.

In one form, a computer-implemented method is provided comprising: connecting, by a first device, to a communication session in which a plurality of devices communicate, the plurality of devices including the first device and a second device, the first device outputting first audio that includes a first audio watermark associated with the communication session, and the second device outputting second audio that includes a second audio watermark associated with the communication session; detecting, by the first device, the second audio watermark in the second audio outputted by the second device; and performing one or more actions in response to detecting the second audio watermark.

In one example, the computer-implemented method further comprises: detecting, by the second device, the first audio watermark in the first audio outputted by the first device, wherein performing the one or more actions includes disabling audio from the first device or the second device. In another example, disabling the audio from the first device or the second device includes disabling the audio from the first device or the second device based on a type of device of the first device or the second device. In another example, disabling the audio from the first device or the second device includes disabling the audio from the first device or the second device based on voice activity detection or an active speaker detection.

In another example, performing the one or more actions includes synchronizing a first microphone associated with the first device with a second microphone associated with the second device. In another example, the first audio watermark includes an identifier associated with the communication session and a first identifier associated with the first device and the second audio watermark includes the identifier associated with the communication session and a second identifier associated with the second device. In another example, performing the one or more actions includes transmitting a message to a server associated with supporting the communication session, the message indicating that the second audio watermark has been detected by the first device.

In another form, a system is provided comprising: one or more memories storing instructions; and one or more processors, operatively coupled to the one or more memories, for executing the instructions to cause performance of: connecting a first device to a communication session in which a plurality of devices communicate, the plurality of devices including the first device and a second device, the first device outputting first audio that includes a first audio watermark associated with the communication session, and the second device outputting second audio that includes a second audio watermark associated with the communication session; detecting the second audio watermark in the second audio outputted by the second device; and performing one or more actions in response to detecting the second audio watermark.

In yet another form, one or more non-transitory computer-readable media storing instructions are provided that, when executed by one or more processors, cause the one or more processors to perform operations including: connecting a first device to a communication session in which a plurality of devices communicate, the plurality of devices including the first device and a second device, the first device outputting first audio that includes a first audio watermark associated with the communication session, and the second device outputting second audio that includes a second audio watermark associated with the communication session; detecting the second audio watermark in the second audio outputted by the second device; and performing one or more actions in response to detecting the second audio watermark.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 502.11 (e.g., Wi-Fi®/Wi-Fi6®), IEEE 502.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

What is claimed is:

1. A computer-implemented method comprising:
    connecting, by a first device, to a communication session in which a plurality of devices communicate, the plurality of devices including the first device and a second device, the first device outputting first audio that includes a first audio watermark associated with the communication session, and the second device outputting second audio that includes a second audio watermark associated with the communication session;
    detecting, by the first device, the second audio watermark in the second audio outputted by the second device;
    identifying one or more factors associated with the first device or the second device in response to detecting the second audio watermark;
    determining whether to disable audio output from the first device or the second device based on the one or more factors; and
    automatically disabling audio output from the first device or the second device based on the determining.

2. The computer-implemented method of claim 1, further comprising:
    detecting, by the second device, the first audio watermark in the first audio outputted by the first device.

3. The computer-implemented method of claim 1, wherein the one or more factors include a type of device and wherein determining whether to disable the audio being output from the first device or the second device includes determining whether to disable the audio being output from the first device or the second device based on the type of device of the first device or the second device.

4. The computer-implemented method of claim 1, wherein the one or more factors include voice activity detection or an active speaker detection and wherein determining whether to disable the audio being output from the first device or the second device includes determining whether to disable the audio being output from the first device or the second device based on the voice activity detection or the active speaker detection.

5. The computer-implemented method of claim 1, wherein the first audio watermark includes an identifier associated with the communication session and a first identifier associated with the first device and the second audio watermark includes the identifier associated with the communication session and a second identifier associated with the second device.

6. The computer-implemented method of claim 1, further comprising transmitting a message to a server associated with supporting the communication session, the message indicating that the second audio watermark has been detected by the first device.

7. The computer-implemented method of claim 1, wherein the first audio watermark is embedded in the first audio by a server associated with supporting the communication session.

8. A system comprising:
    one or more memories storing instructions; and
    one or more processors, operatively coupled to the one or more memories, for executing the instructions to cause performance of:
        connecting a first device to a communication session in which a plurality of devices communicate, the plurality of devices including the first device and a second device, the first device outputting first audio that includes a first audio watermark associated with the communication session, and the second device outputting second audio that includes a second audio watermark associated with the communication session;
        detecting the second audio watermark in the second audio outputted by the second device;
        identifying one or more factors associated with the first device or the second device in response to detecting the second audio watermark;
        determining whether to disable audio output from the first device or the second device based on the one or more factors; and
        automatically disabling audio output from the first device or the second device based on the determining.

9. The system of claim 8, wherein the instructions further cause performance of:
    detecting, by the second device, the first audio watermark in the first audio outputted by the first device.

10. The system of claim 8, wherein the one or more factors include a type of device and wherein, when determining whether to disable the audio output from the first device or the second device, the instructions further cause performance of determining whether to disable the audio output from the first device or the second device based on the type of device of the first device or the second device.

11. The system of claim 8, wherein the one or more factors include voice activity detection or an active speaker detection and wherein, when determining whether to disable the audio output from the first device or the second device, the instructions further cause performance of determining whether to disable the audio output from the first device or the second device based on the voice activity detection or the active speaker detection.

12. The system of claim 8, wherein the first audio watermark includes an identifier associated with the communication session and a first identifier associated with the first device and the second audio watermark includes the identifier associated with the communication session and a second identifier associated with the second device.

13. The system of claim 8, wherein the instructions further cause performance of transmitting a message to a server associated with supporting the communication session, the message indicating that the second audio watermark has been detected by the first device.

14. The system of claim 8, wherein the first audio watermark is embedded in the first audio by a server associated with supporting the communication session.

15. One or more non-transitory computer-readable media storing instructions which, when executed by one or more processors, cause the one or more processors to perform operations including:
- connecting a first device to a communication session in which a plurality of devices communicate, the plurality of devices including the first device and a second device, the first device outputting first audio that includes a first audio watermark associated with the communication session, and the second device outputting second audio that includes a second audio watermark associated with the communication session;
- detecting the second audio watermark in the second audio outputted by the second device;
- identifying one or more factors associated with the first device and the second device in response to detecting the second audio watermark;
- determining whether to disable audio output from the first device or the second device based on the one or more factors; and
- automatically disabling audio output from the first device or the second device based on the determining.

16. The one or more non-transitory computer-readable media of claim 15, wherein the instructions further cause the one or more processors to perform operations including:
- detecting, by the second device, the first audio watermark in the first audio outputted by the first device.

17. The one or more non-transitory computer-readable media of claim 15, wherein the one or more factors include a type of device and wherein, when determining whether to disable the audio output from the first device or the second device, the instructions further cause the one or more processors to perform operations including determining whether to disable the audio output from the first device or the second device based on the type of device of the first device or the second device.

18. The one or more non-transitory computer-readable media of claim 15, wherein the one or more factors include voice activity detection or active speaker detection and wherein, when determining whether to disable the audio output from the first device or the second device, the instructions further cause the one or more processors to perform operations including determining whether to disable the audio output from the first device or the second device based on the voice activity detection or the active speaker detection.

19. The one or more non-transitory computer-readable media of claim 15, wherein the first audio watermark includes an identifier associated with the communication session and a first identifier associated with the first device and the second audio watermark includes the identifier associated with the communication session and a second identifier associated with the second device.

20. The one or more non-transitory computer-readable media of claim 15, wherein the first audio watermark is embedded in the first audio by a server associated with supporting the communication session.

* * * * *